United States Patent [19]
Donchey

[11] Patent Number: 5,890,455
[45] Date of Patent: Apr. 6, 1999

[54] COMBINATION WINDOW MOUNTED PET/PLANT ENCLOSURE AND CARRYING CASE

[76] Inventor: Jonathan H. Donchey, 574 Grant Pl., Cedarhurst, N.Y. 11516

[21] Appl. No.: 889,791

[22] Filed: Jul. 10, 1997

Related U.S. Application Data

[60] Provisional application No. 60/034,370 Dec. 26, 1996.

[51] Int. Cl.⁶ ..................................................... A01K 1/03
[52] U.S. Cl. ............................... 119/484; 119/497; 47/68
[58] Field of Search ..................... 119/481, 484, 119/497, 496, 501; 47/68

[56] References Cited

U.S. PATENT DOCUMENTS

| | | | |
|---|---|---|---|
| 3,593,467 | 7/1971 | Francis | 47/68 X |
| 3,946,522 | 3/1976 | Schifman | 47/68 |
| 4,445,459 | 5/1984 | Julie | 119/484 X |
| 4,989,546 | 2/1991 | Cannaday | 119/484 |
| 5,148,767 | 9/1992 | Torchio. | |
| 5,357,900 | 10/1994 | Ho | 119/497 X |
| 5,522,344 | 6/1996 | Demurjian | 119/474 |

OTHER PUBLICATIONS

*Cats* Mar. 97 Advertisement(The Pet Patio) Magazine.

*Primary Examiner*—Robert P. Swiatek
*Attorney, Agent, or Firm*—Richard L Miller, P. E.

[57] ABSTRACT

A combination window mounted pet/plant enclosure and carrying case capable of replaceably housing a pet/plant therein and having a window mounted pet/plant enclosure modality where it is adapted to be maintained in an opening of a double hung window that has a sill and separates the outdoors from the indoors and a pet/plant carrying case modality where it is removed from the opening of the double hung window and adapted to carry the pet/plant housed therein. The combination includes a housing that extends from the opening of the double hung window to the outdoors and replaceably houses the pet/plant therein, and a facia assembly that is attached to the housing and extends from the opening of the double hung window into the indoors and provides access into the housing.

20 Claims, 2 Drawing Sheets

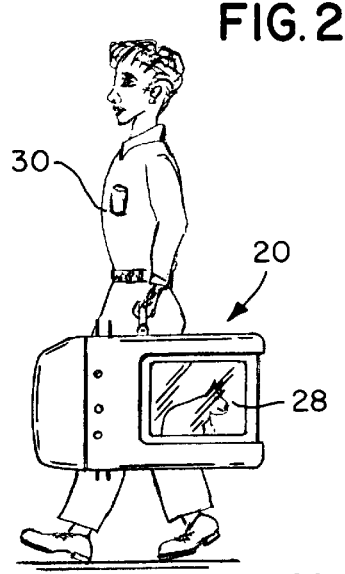
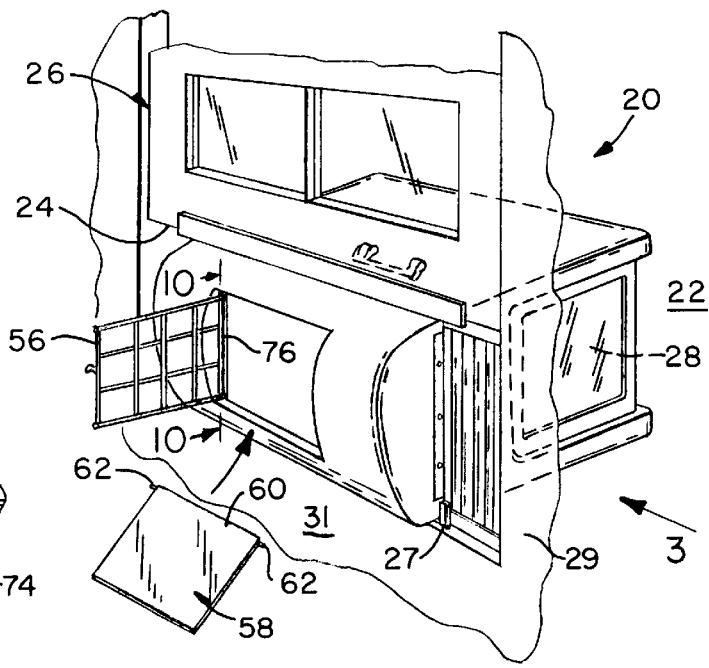
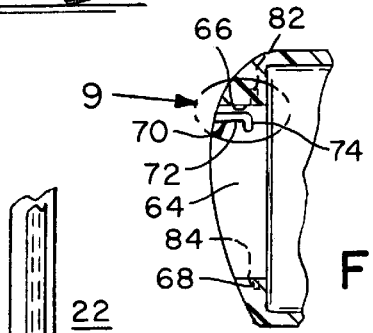
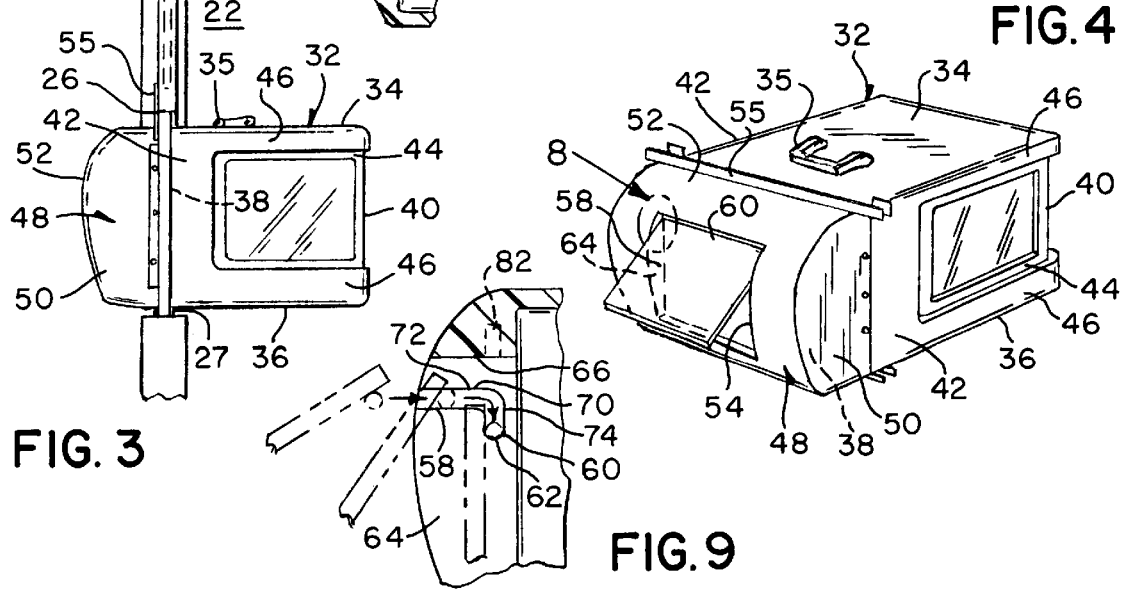

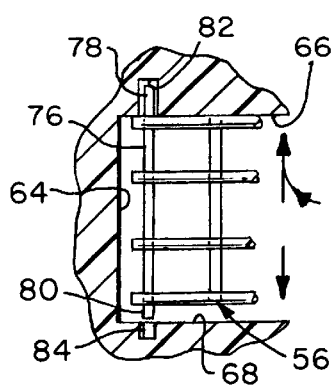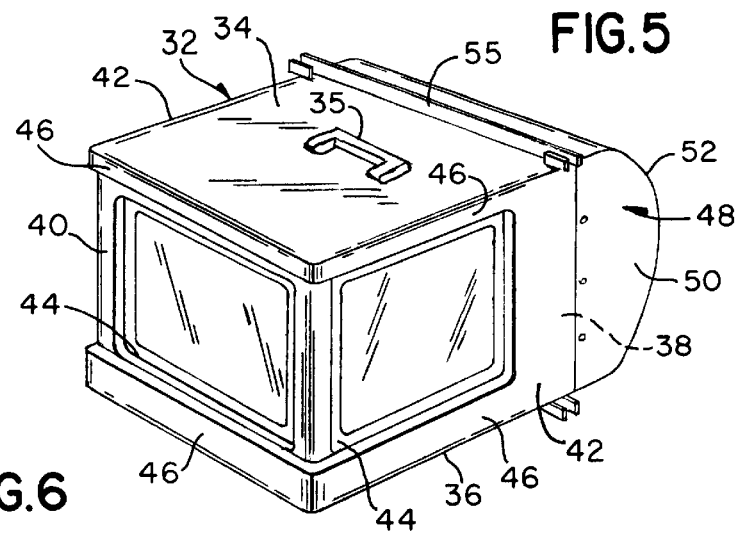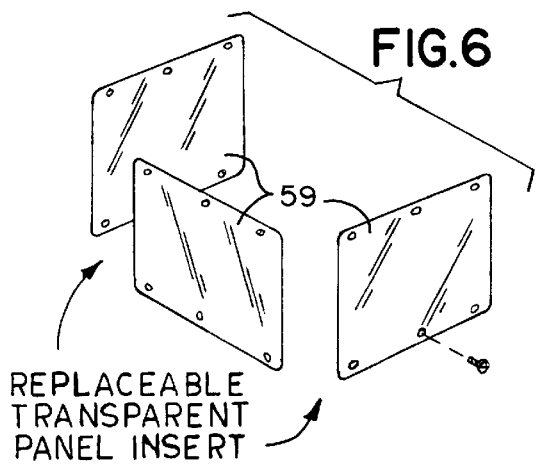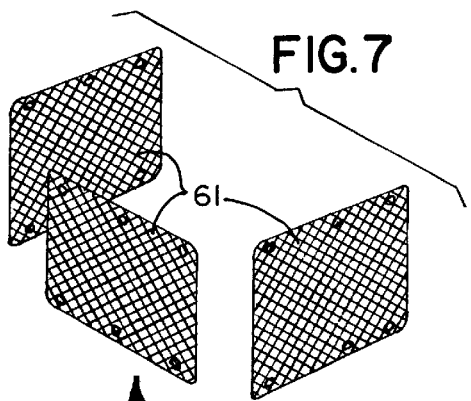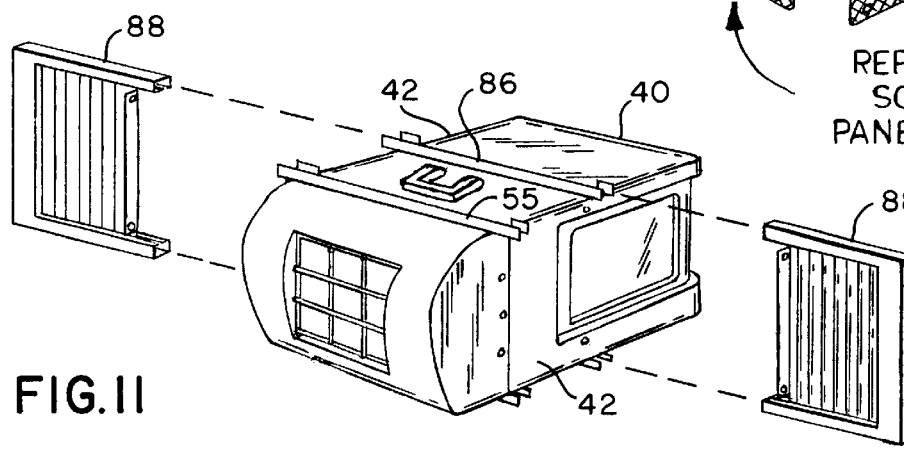

5,890,455

COMBINATION WINDOW MOUNTED PET/PLANT ENCLOSURE AND CARRYING CASE

CROSS REFERENCE TO RELATED APPLICATIONS

The instant application is a continuation-in-part of provisional application Ser. No. 60/034,370 filed on Dec. 26, 1996.

BACKGROUND OF THE INVENTION

1. Field of the Invention

The present invention relates to an enclosure. More particularly, the present invention relates to a combination window mounted pet/plant enclosure and carrying case.

2. Description of the Prior Art

Numerous innovations for window mounted pet/plant enclosures have been provided in the prior art that will be described. Even though these innovations may be suitable for the specific individual purposes to which they address, however, they differ from the present invention.

FOR EXAMPLE, U.S. Pat. No. 3,946,522 to Schifman teaches a device for growing houseplants. The device is adapted to extend from a window such that the plants provided therein receive adequate sunlight. The device is enclosed on all sides extending from the window to protect the plants from exposure to temperature excesses. The rear of the box is open and communicates with the interior of a room to maintain the plants at a temperature substantially equivalent to the indoor temperature. The device is provided with a pull-out drawer to provide easy access to the plants and vents for permitting outside air to enter the device. Flexible baffle curtains are provided so that the entire window area through which the planter box extends may be closed off from the outside.

ANOTHER EXAMPLE, U.S. Pat. No. 4,445,459 to Julie teaches a removable, assemblable and portable window porch and container for animals pets which is adapted to interfit within, project from and extend the opening of a standard window. The device has attaching clamps and braces secured to and carried by the elements thereof. The porch when in operative position is in the form of an open entry enclosure comprising assemblable base, side, rear and top walls for effectuating operative condition. The side, rear and top walls include frame pieces adapted for selective panel mounting and substitution to enable protection to the pet against adverse weather and atmospheric conditions. The porch is further adapted for pet transportation when in operative condition by providing a removable front wall closure and further providing a carrying handle. The porch when in disassembled position may be easily stored away and is characterized by taking little space in stored condition.

STILL ANOTHER EXAMPLE, U.S. Pat. No. 5,148,767 to Torchio teaches an enclosure arranged for mounting within a frame-work of an associated window to permit a pet to be received within the enclosure to permit access to fresh air when the pet is maintained within an interior environment in a dwelling. The enclosure is arranged to be formed with spaced side walls and an end wall, with each of the walls having a screen member mounted therewithin. The invention in modified form may include window plates pivotally mounted above each screen member and may be further provided with a heating assembly to provide heating within the enclosure during periods of depressed temperature conditions.

FINALLY, YET ANOTHER EXAMPLE, U.S. Pat. No. 5,522,344 to Demurjian teaches a pet cage capable of ready disassembly and erection for mounting within a window having a bottom rail and a stop, and projecting beyond the window opening. The pet cage consists of a 5-sided enclosure, including a hollow panel. An accordion-pleated panel assembly is removably connected to the enclosure for adjustably extending between the enclosure and the window stop. Upon disassembly, the panel assembly is removed from the enclosure and stored within the hollow panel so that the disassembled pet cage forms a single, compact, portable structure.

It is apparent that numerous innovations for window mounted pet/plant enclosures have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a combination window mounted pet/plant enclosure and carrying case that avoids the disadvantages of the prior art.

ANOTHER OBJECT of the present invention is to provide a combination window mounted pet/plant enclosure and carrying case that is simple and inexpensive to manufacture.

STILL ANOTHER OBJECT of the present invention is to provide a combination window mounted pet/plant enclosure and carrying case that is simple to use.

BRIEFLY STATED, YET ANOTHER OBJECT of the present invention is to provide a combination window mounted pet/plant enclosure and carrying case capable of replaceably housing a pet/plant therein and having a window mounted pet/plant enclosure modality where it is adapted to be maintained in an opening of a double hung window that has a sill and separates the outdoors from the indoors and a carrying case modality where it is removed from the opening of the double hung window and adapted to carry the pet/plant housed therein. The combination includes a housing that extends from the opening of the double hung window to the outdoors and replaceably houses the pet/plant therein, and a facia assembly that is attached to the housing and extends from the opening of the double hung window into the indoors and provides access into the housing.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention in its window mounted pet/plant enclosure modality;

FIG. 2 is a diagrammatic perspective view of the present invention in its pet/plant carrying case modality;

FIG. 3 is a diagrammatic side elevational view taken generally in the direction of arrow 3 in FIG. 1, illustrating the interface between the present invention and the double hung window;

FIG. 4 is a diagrammatic front perspective view of the present invention;

FIG. 5 is a diagrammatic rear perspective view of the present invention;

FIG. 6 is an exploded diagrammatic perspective view of the replaceable transparent panel inserts of the present invention;

FIG. 7 is an exploded diagrammatic perspective view of the replaceable screen panel inserts of the present invention;

FIG. 8 is an enlarged cross sectional view of the area generally enclosed by the dotted ellipse identified by arrow 8 in FIG. 4, illustrating the mounting apparatus for the solid entrance door;

FIG. 9 is an enlarged cross sectional view of the area generally enclosed by the dotted ellipse identified by arrow 9 in FIG. 8, illustrating the mounting apparatus for the solid entrance door in greater detail;

FIG. 10 is an enlarged cross sectional view taken on the line 10—10 in FIG. 1, illustrating the mounting apparatus for the grated entrance door; and FIG. 11 is a diagrammatic perspective view of the present invention with the pair of stops and the pair of expandable panels.

LIST OF REFERENCE NUMERALS UTILIZED IN THE DRAWING 20 combination window mounted pet/plant enclosure and carrying case of the present invention
22 outdoors
24 opening of double hung window 26
26 double hung window
27 sill of double hung window 26
29 frame of double hung window 26
28 pet/plant
30 user
31 indoors
32 housing
34 top panel of housing 32
35 carrying handle on top panel 34 of housing 32
36 bottom panel of housing 32
38 open front of housing 32
40 back panel of housing 32
42 pair of side panels of housing 32
44 openings in each side panel of pair of side panels 42 of housing 32 and back panel 40 of housing 32
46 reenforcing channels of pair of side panels 42 of housing 32 and back panel 40 of housing 32
48 facia assembly
50 pair of side panels of facia assembly 48
52 facia panel of facia assembly 48
54 entrance opening in facia panel 52 of facia assembly 48
55 first stop
56 grated door
58 solid door
59 transparent
61 screen
60 upper edge of solid door 58
62 pair of opposing collinear pins on upper edge 60 of solid door 58
64 pair of inner side walls of facia panel 52 of facia assembly 48
66 inner upper wall of facia panel 52 of facia assembly 48
68 inner lower wall of facia panel 52 of facia assembly 48
70 L-shaped recess in at least one inner side wall of pair of inner side walls 64 of facia panel 52 of facia assembly 48
72 long leg of L-shaped recess 70 in at least one inner side wall of pair of inner side walls 64 of facia panel 52 of facia assembly 48
74 short leg of L-shaped recess 70 in at least one inner side wall of pair of inner side walls 64 of facia panel 52 of facia assembly 48
76 pivot bar of grated door 56
78 long upper extreme of pivot bar 76 of grated door 56
80 short lower extreme of pivot bar 76 of grated door 56
82 long bore in inner upper wall 66 of facia panel 52 of facia assembly 48
84 short bore 84 in inner lower wall 68 of facia panel 52 of facia assembly 48
86 second stop
88 pair of expanding and retracting accordion panels

DETAILED DESCRIPTION OF THE PREFERRED EMBODIMENT

Referring now to the figures in which like numerals indicate like parts, and particularly to FIG. 1, the combination window mounted pet/plant enclosure and carrying case of the present invention is shown generally at 20 in its window mounted pet/plant enclosure modality and mounted in and extending into the outdoors 22 from an opening 24 of a double hung window 26 that has a sill 27 and a frame 29, and housing a pet/plant 28 therein so as to allow the pet/plant 28 to be exposed to and reap the benefits of the outdoors 22 without the dangers thereof, with the pet/plant entering and leaving the combination window mounted pet/plant enclosure and carrying case 20 from the indoors 31.

As shown in FIG. 2, the combination window mounted pet/plant enclosure and carrying case 20 is in its pet/plant carrying case modality and removed from the opening 24 of the double hung window 26 with the pet/plant 28 therein, and being carried by a user 30 so as to allow the pet/plant 28 to be easily transported without the need for a separate carrying case.

The general configuration of the combination window mounted pet/plant enclosure and carrying case 20 can best be seen in FIGS. 3–5, and as such will be discussed with reference thereto.

The combination window mounted pet/plant enclosure and carrying case 20 includes a housing 32 that is hollow and generally rectangular-parallelepiped-shaped and houses the pet/plant 28 therein.

The housing 32 has a top panel 34 that is generally rectangular-shaped and abutted upon by and extends from the double hung window 26 into the outdoors 22 when the combination window mounted pet/plant enclosure and carrying case 20 is being utilized in its window mounted pet/plant enclosure modality.

The top panel 34 of the housing 32 has a carrying handle 35 thereon that allows the combination window mounted pet/plant enclosure and carrying case 20 to be carried when it is in its pet/plant carrying case modality.

The housing 32 further has a bottom panel 36 that is generally rectangular-shaped and parallel to and disposed below the top panel 34 of the housing 32 and rests on the sill 27 of the double hung window 26 and extends from the double hung window 26 into the outdoors 22 when the combination window mounted pet/plant enclosure and carrying case 20 is being utilized in its window mounted pet/plant enclosure modality.

The housing 32 further has an open front 38 that is generally rectangular-shaped and extends from the top panel 34 of the housing 32 to the bottom panel 36 of the housing 32, at their fronts, and is generally coplanar with the double hung window 26 when the combination window mounted pet/plant enclosure and carrying case 20 is being utilized in its window mounted pet/plant enclosure modality.

The housing further has a back panel 40 that is generally rectangular-shaped and extends from the top panel 34 of the housing 32 to the bottom panel 36 of the housing 32, at their backs, and is disposed in the outdoors 22 when the combination window mounted pet/plant enclosure and carrying case 20 is being utilized in its window mounted pet/plant enclosure modality.

The housing further has a pair of side panels 42 that are generally rectangular-shaped and extend from the top panel 34 of the housing 32 to the bottom panel 36 of the housing 32, and from the open front 38 of the housing 32 to the back panel 40 of the housing 32, and are disposed in the outdoors 22 when the combination window mounted pet/plant enclosure and carrying case 20 is being utilized in its window mounted pet/plant enclosure modality.

Each side panel of the pair of side panels 42 of the housing 32 and the back panel 40 of the housing 32 have openings 44 therein that are recessed and extend over a majority thereof.

It is to be understood that by having the openings 44 recessed, the openings 44 can extend over the majority of the pair of side panels 42 of the housing 32 and the back panel 40 of the housing 32 without structural failure, by the pair of side panels 42 of the housing 32 and the back panel 40 of the housing 32 forming with the top panel 34 of the housing 32 and the bottom panel 36 of the housing 32, reenforcing channels 46.

The combination window mounted pet/plant enclosure and carrying case 20 further includes a facia assembly 48 that is attached to the housing 32 and closes the open front 38 of the housing 32, and extends into the indoors 31 when the combination window mounted pet/plant enclosure and carrying case 20 is utilized in its window mounted pet/plant enclosure modality.

The facia assembly 48 includes a pair of side panels 50 that extend coplanarly from and are of the same height as the pair of side panels 42 of the housing 32.

The facia assembly 48 further includes a facia panel 52 that is convex-shaped and extends between the pair of side panels 50 of the facia assembly 48, and from the top panel 34 of the housing 32 to the bottom panel 36 of the housing 32, and from the double hung window 26 to the sill 27 of the double hung window 26 when the combination window mounted pet/plant enclosure and carrying case 20 is being utilized in its window mounted pet/plant enclosure modality.

The facia panel 52 of the facia assembly 48 has an entrance opening 54 therein that allows access into and out of the combination window mounted pet/plant enclosure and carrying case 20.

The combination window mounted pet/plant enclosure and carrying case 20 further includes a first stop 55 that is slender, elongated, and generally rectangular-shaped, and extends across and upwardly from the top panel 34 of the housing 32, at the open front 38 of the housing 32, and abuts against the double hung window 26 when the combination window mounted pet/plant enclosure and carrying case 20 is being utilized in its window mounted pet/plant enclosure modality so as to prevent the combination window mounted pet/plant enclosure and carrying case 20 from falling into the outdoors 22 as a result of the lever arm created by the overhang of the housing 32.

As shown in FIG. 1 the entrance opening 54 in the facia panel 52 of the facia assembly 48 is selectively opened and closed by one of a grated door 56 that is horizontally pivotally mounted to the facia plate 54 of the facia assembly 48 and a solid door 58 that is vertically pivotally mounted to the facia plate 54 of the facia assembly 48, and whose structures will be discussed further infra.

As shown in FIGS. 6 and 7, the openings 44 in the pair of side panels 42 of the housing 32 and the back panel 40 of the housing 32 are closed by replaceably screwed panel inserts that are one of transparent 59 and screen 61 so as to prevent the pet/plant 28 housed in the combination window mounted pet/plant enclosure and carrying case 20 from falling out therefrom.

The configuration of the solid door 58 and its mounting apparatus can best be seen in FIGS. 4, 8 and 9, and as such will be discussed with reference thereto.

The solid door 58 is sized to fill the entrance opening 54 in the facia panel 52 of the facia assembly 48 and has an upper edge 60 with a pair of opposing collinear pins 62 that extend outwardly from opposite ends thereof.

The facia panel 52 of the facia assembly 48 has a pair of inner side walls 64, an inner upper wall 66, and an inner lower wall 68 that together define the entrance opening 54 in the facia panel 52 of the facia assembly 48.

Each inner side wall of the pair of inner side walls 64 of the facia panel 52 of the facia assembly 48 has therein disposed in close proximity to the inner upper wall 66 one of an L-shaped recess 70 and a lateral bore, with the L-shaped recess 70 having a long leg 72 that opens into and extends generally perpendicularly inwardly from the facia panel 52 of the facia assembly 48 and a short leg 74 that extends perpendicularly downwardly form the long leg 72 of the L-shaped recess 70, at its innermost end, and with the lateral bore being opposed to the short leg 74 of the L-shaped recess 70.

It is to be understood that when each inner side wall of the pair of inner side walls 64 of the facia panel 52 of the facia assembly 48 has therein the L-shaped recess 70, the pair of opposing collinear pins 62 on the upper edge 60 of the solid door 58 are slid into the long leg 72 of the L-shaped recess 70 in each inner side wall of the pair of inner side walls 64 of the facia panel 52 of the facia assembly 48 and dropped down into the short leg 74 of the L-shaped recess 70 in each inner side wall of the pair of inner side walls 64 of the facia panel 52 of the facia assembly 48 where they are nested for pivotal rotation therein so as to allow the solid door 58 to vertically pivot and selectively open and close the entrance opening 54 in the facia panel 52 of the facia assembly 48.

It is to be understood that when one inner side wall of the pair of inner side walls 64 of the facia panel 52 of the facia assembly 48 has therein the L-shaped recess 70 and another inner side wall of the pair of inner side walls 64 of the facia panel 52 of the facia assembly 48 has therein the lateral bore, one pin of the pair of opposing collinear pins 62 on the upper edge 60 of the solid door 58 is positioned in the lateral bore in the another inner side wall of the pair of inner side walls 64 of the facia panel 52 of the facia assembly 48, with another pin of the pair of opposing collinear pins 62 on the upper edge 60 of the solid door 58 slid into the long leg 72 of the L-shaped recess 70 in the one inner side wall of the pair of inner side walls 64 of the facia panel 52 of the facia assembly 48 and dropped down into the short leg 74 of the L-shaped recess 70 in the one inner side wall of the pair of inner side walls 64 of the facia panel 52 of the facia assembly 48 where it is nested for pivotal rotation therein so as to allow the solid door 58 to vertically pivot and selectively open and close the entrance opening 54 in the facia panel 52 of the facia assembly 48.

The configuration of the grated door 56 and its mounting apparatus can best be seen in FIGS. 1, 9 and 10, and as such will be discussed with reference thereto.

The grated door 56 is sized to fill the entrance opening 54 in the facia panel 52 of the facia assembly 48 and has as one of its bars a pivot bar 76 that is vertically-oriented and has a long upper extreme 78 and a short lower extreme 80 that extends less than the long upper extreme 78 of the pivot bar 76 of the grated door 56.

The inner upper wall 66 of the facia panel 52 of the facia assembly 48 has therein a long bore 82 that is disposed in close proximity to one side wall of the pair of side walls 64, and the inner lower wall 68 of the facia panel 52 of the facia assembly 48 has a short bore 84 therein that is shorter than and opposes the long bore 82 in the inner upper wall 66 of the facia panel 52 of the facia assembly 48, with the long upper extreme 78 of the pivot bar 76 of the grated door 56 positioned in the long bore 82 in the inner upper wall 66 of the facia panel 52 of the facia assembly 48 and the short lower extreme 80 of the pivot bar 76 of the grated door 56 dropped into the short bore 84 in the inner lower wall 68 of the facia panel 52 of the facia assembly 48 where it is nested for pivotal rotation therein so as to allow the grated door 56 to horizontally pivot and selectively open and close the entrance opening 54 in the facia panel 52 of the facia assembly 48.

As shown in FIG. 11, the combination window mounted pet/plant enclosure and carrying case 20 can further include a second stop 86 that is slender, elongated, and generally rectangular-shaped, and extends across and upwardly from the top panel 34 of the housing 32, between and parallel to the first stop 55 and the back panel 40 of the housing 32, and abuts against the double hung window 26 when the combination window mounted pet/plant enclosure and carrying case 20 is being utilized in its window mounted pet/plant enclosure modality so as to reduce the overhang of the housing 32.

The combination window mounted pet/plant enclosure and carrying case 20 further includes a pair of expanding and retracting accordion panels 88 that are replaceably attached to and extend outwardly from the pair of side panels 42 of the housing 32, and fill any remaining space in the opening 24 of the double hung window 26 when the combination window mounted pet/plant enclosure and carrying case 20 is utilized in its window mounted pet/plant enclosure modality.

The pair of expanding and retracting accordion panels 88 are replaceably attached to and extend outwardly from the pair of side panels 42 of the housing 32, in alignment with one of the first stop 55 and the second stop 86, depending upon which of the first stop 55 and the second stop 86 is being used.

It will be understood that each of the elements described above, or two or more together, may also find a useful application in other types of constructions differing from the types described above.

While the invention has been illustrated and described as embodied in a combination window mounted pet/plant enclosure and carrying case, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A combination window mounted pet and plant enclosure and carrying case capable of replaceably housing a pet and plant therein and having a window mounted pet and plant enclosure modality where it is adapted to be maintained in an opening of a double hung window that has a sill and separates the outdoors from the indoors and a pet and plant carrying case modality where it is removed from the opening of the double hung window and adapted to carry the pet and plant housed therein, said combination comprising:

a) a housing extendable from the opening of the double hung window to the outdoors and replaceable housing the pet and plant therein; and b) a facia assembly attached to said housing and extendable from the opening of the double hung window into the indoors and providing access into said housing, wherein said housing has a top panel that is generally rectangular-shaped and abutted upon by and extends from the double hung window into the outdoors when said combination window mounted pet and plant enclosure and carrying case is being utilized in its window mounted pet and plant enclosure modality, wherein said housing further has a bottom panel that is generally rectangular-shaped and parallel to and disposed below said top panel of said housing and rests on the sill of the double hung window and extends from the double hung window into the outdoors when said combination window mounted pet and plant enclosure and carrying case is being utilized in its window mounted pet and plant enclosure modality, wherein said housing further has an open front that is generally rectangular-shaped and extends from said top panel of said housing to said bottom panel of said housing, at their fronts, and is generally coplanar with the double hung window when said combination window mounted pet and plant enclosure and carrying case is being utilized in its window mounted pet and plant enclosure modality, wherein said housing further has a back panel that is generally rectangular-shaped and extends from said top panel of said housing to said bottom panel of said housing, at their backs, and is disposed in the outdoors when said combination window mounted pet and plant enclosure and carrying case is being utilized in its window mounted pet and plant enclosure modality, wherein said housing further has a pair of side panels that are generally rectangular-shaped and extend from said top panel of said housing to said bottom panel of said housing, and from said open front of said housing to said back panel of said housing, and are disposed in the outdoors when said combination window mounted pet and plant enclosure and carrying case is being utilized in its window mounted pet and plant enclosure modality, wherein said facia assembly includes a pair of side panels that extend coplanarly from and are of the same height as said pair of side panels of said housing.

2. The combination as defined in claim 1, wherein said housing is hollow and generally rectangular-parallelepiped-shaped.

3. The combination as defined in claim 1, wherein said top panel of said housing has a carrying handle thereon that allows said combination window mounted pet and plant enclosure and carrying case to be carried when it is in its pet/plant carrying case modality.

4. The combination as defined in claim 1, wherein each side panel of said pair of side panels of said housing and said back panel of said housing are recessed and have openings therein that extend over a majority thereof, with said panels being recessed so as to allow said openings to extend over said majority of said pair of side panels of said housing and said back panel of said housing without structural failure, with said pair of side panels of said housing and said back panel of said housing forming with said top panel of said housing and said bottom panel of said housing, reenforcing channels.

5. The combination as defined in claim 4, wherein said openings in said pair of side panels of said housing and said back panel of said housing are closed by replaceably screwed panel inserts that are selected from the group consisting of transparent and screen so as to prevent the pet and plant housed in said combination window mounted pet and plant enclosure and carrying case from falling out therefrom.

6. The combination as defined in claim 1, wherein said facia assembly closes said open front of said housing.

7. The combination as defined in claim 1, wherein said facia assembly further includes a facia panel that is convex-shaped and extends between said pair of side panels of said facia assembly, and from said top panel of said housing to said bottom panel of said housing, and from the double hung window to the sill of the double hung window when said combination window mounted pet and plant enclosure and carrying case is being utilized in its window mounted pet and plant enclosure modality.

8. The combination as defined in claim 7, wherein said facia panel of said facia assembly has an entrance opening therein that allows access into and out of said combination window mounted pet and plant enclosure and carrying case.

9. The combination as defined in claim 8, wherein said entrance opening in said facia panel of said facia assembly is selectively opened and closed by one of a grated door that is horizontally pivotally mounted to said facia plate of said facia assembly and a solid door that is vertically pivotally mounted to said facia plate of said facia assembly.

10. The combination as defined in claim 9, wherein said solid door is sized to fill said entrance opening in said facia panel of said facia assembly, and has an upper edge with a pair of opposing collinear pins that extend outwardly from opposite ends thereof.

11. The combination as defined in claim 10, wherein said facia panel of said facia assembly has a pair of inner side walls, an inner upper wall, and an inner lower wall that together define said entrance opening in said facia panel of said facia assembly.

12. The combination as defined in claim 11, wherein each inner side wall of said pair of inner side walls of said facia panel of said facia assembly has disposed therein in close proximity to said inner upper wall one of an L-shaped recess and a lateral bore; said L-shaped recess has a long leg that opens into and extends generally perpendicularly inwardly from said facia panel of said facia assembly and a short leg that extends perpendicularly downwardly form said long leg of said L-shaped recess, at its innermost end; said lateral bore being opposed to said short leg of said L-shaped recess.

13. The combination as defined in claim 12, wherein said pair of opposing collinear pins on said upper edge of said solid door are slid into said long leg of said L-shaped recess in each inner side wall of said pair of inner side walls of said facia panel of said facia assembly and dropped down into said short leg of said L-shaped recess in each inner side wall of said pair of inner side walls of said facia panel of said facia assembly where they are nested for pivotal rotation therein so as to allow said solid door to vertically pivot and selectively open and close said entrance opening in said facia panel of said facia assembly when each inner side wall of said pair of inner side walls of said facia panel of said facia assembly has therein said L-shaped recess.

14. The combination as defined in claim 12, wherein one pin of said pair of opposing collinear pins on said upper edge of said solid door is positioned in said lateral bore in one inner side wall of said pair of inner side walls of said facia panel of said facia assembly, with another pin of said pair of opposing collinear pins on said upper edge of said solid door slid into said long leg of said L-shaped recess in another inner side wall of said pair of inner side walls of said facia panel of said facia assembly and dropped down into said short leg of said L-shaped recess in said another inner side wall of said pair of inner side walls of said facia panel of said facia assembly where it is nested for pivotal rotation therein so as to allow said solid door to vertically pivot and selectively open and close said entrance opening in said facia panel of said facia assembly when one inner side wall of said pair of inner side walls of said facia panel of said facia assembly has therein said L-shaped recess and another inner side wall of said pair of inner side walls of said facia panel of said facia assembly has therein said lateral bore.

15. The combination as defined in claim 11, wherein said grated door is sized to fill said entrance opening in said facia panel of said facia assembly and has as one of its bars a pivot bar that is vertically-oriented and has a long upper extreme and a short lower extreme that extends less than said long upper extreme of said pivot bar of said grated door.

16. The combination as defined in claim 15, wherein said inner upper wall of said facia panel of said facia assembly has therein a long bore that is disposed in close proximity to one inner side wall of said pair of inner side walls of said facia panel of said facia assembly, and said inner lower wall of said facia panel of said facia assembly has a short bore therein that is shorter than and opposes said long bore in said inner upper wall of said facia panel of said facia assembly, with said long upper extreme of said pivot bar of said grated door positioned in said long bore in said inner upper wall of said facia panel of said facia assembly and said short lower extreme of said pivot bar of said grated door dropped into said short bore in said inner lower wall of said facia panel of said facia assembly where it is nested for pivotal rotation therein so as to allow said grated door to horizontally pivot and selectively open and close said entrance opening in said facia panel of said facia assembly.

17. The combination as defined in claim 1; further comprising a first stop that is slender, elongated, and generally rectangular-shaped, and extends across and upwardly from said top panel of said housing, at said open front of said housing, and abuts against the double hung window when said combination window mounted pet and plant enclosure and carrying case is being utilized in its window mounted pet and plant enclosure modality so as to prevent said combination window mounted pet and plant enclosure and carrying case from falling into the outdoors as a result of the lever arm created by the overhang of said housing.

18. The combination as defined in claim 17; further comprising a second stop that is slender, elongated, and generally rectangular-shaped, and extends across and upwardly from said top panel of said housing, between and parallel to said first stop and said back panel of said housing, and abuts against the double hung window when said combination window mounted pet and plant enclosure and carrying case is being utilized in its window mounted pet and plant enclosure modality so as to reduce the overhang of the housing.

19. The combination as defined in claim 18; further comprising a pair of expanding and retracting accordion panels that are replaceably attached to and extend outwardly from said pair of side panels of said housing, and fill any remaining space in the opening of the double hung window when the combination window mounted pet and plant enclosure and carrying case is utilized in its window mounted pet and plant enclosure modality.

20. The combination as defined in claim 19, wherein said pair of expanding and retracting accordion panels are replaceably attached to and extend outwardly from said pair of side panels of said housing, in alignment with one of said first stop and said second stop, depending upon which of said first stop and said second stop is being used.

* * * * *